Aug. 6, 1935.  W. I. JONES  2,010,519
SHEET METAL NUT STRUCTURE
Filed April 21, 1934
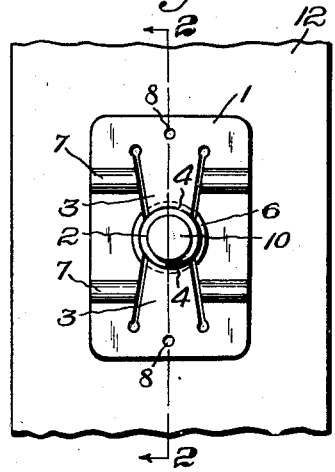
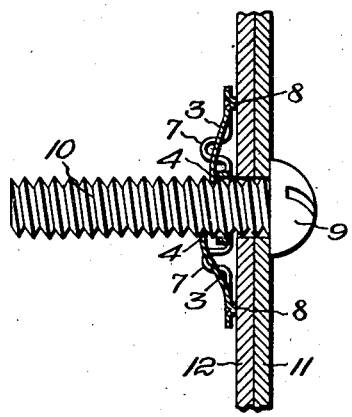
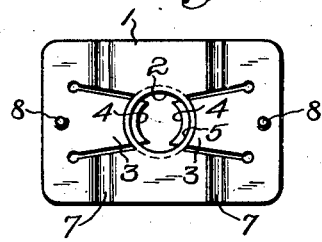
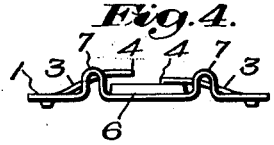
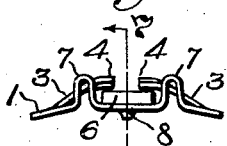
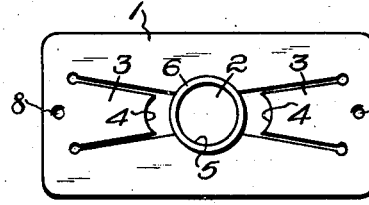
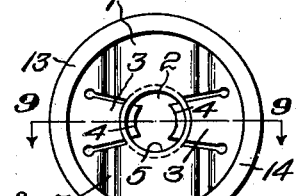
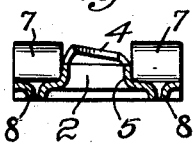
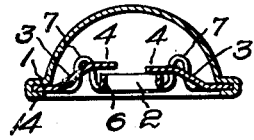
Inventor:
Walter I. Jones Patented Aug. 6, 1935

2,010,519

UNITED STATES PATENT OFFICE 2,010,519

SHEET METAL NUT STRUCTURE

Walter I. Jones, Arlington, Mass., assignor to United-Carr Fastener Corporation, Cambridge, Mass., a corporation of Massachusetts Application April 21, 1934, Serial No. 721,731

9 Claims. (Cl. 85—36)

My invention aims to provide improvements in sheet metal nut structures particularly, though not exclusively, adapted to engage the shank of a screw member.

Referring to the drawing which illustrates preferred embodiments of my invention:—

Figure 1 is an elevational view of an installation showing my improved device in use;

Fig. 2 is a section taken on the line 2—2 of Figure 1;

Fig. 3 is a bottom plan view of the nut member;

Fig. 4 is a side elevation of the nut member;

Fig. 5 is a plan view of a partially formed nut member;

Fig. 6 is a side elevation of a nut member with a normally curved base and angled thread-engaging portions;

Fig. 7 is an enlarged section taken on the line 7—7 of Fig. 6;

Fig. 8 is a bottom plan view of one of my improved nut members assembled with a cap; and Fig. 9 is a section taken on the line 9—9 of Fig. 8.

My invention as illustrated by the annexed drawing relates particularly to what might be termed a sheet metal speed and lock nut, since it may be engaged with the threaded shank of a screw or the like by a straight thrust and may be locked to the shank of the screw against accidental loosening by a slight amount of rotation of the screw after the initial attachment by axial approaching movement. While I am aware of the fact that this type of device is not broadly new, my improved structures embody features which are novel and provide an important advance in the art, at least so far as I am aware.

Referring now to the specific embodiment of my invention illustrated by Figs. 1 through 5 inclusive, I have shown a so-called nut structure formed from a single piece of relatively thin sheet metal and provided with a base 1, an aperture 2 located centrally of the base and a pair of yieldable shank-engaging portions 3—3. The yieldable shank-engaging portions 3—3 are formed from material of the base and shaped in such a manner that they extend away from the base from opposite sides thereof and toward the center of the body portion 1, as clearly illustrated in Figs. 3 and 4. The free end portions 4—4 of the yieldable portions 3—3 are preferably curved partially to encircle the shank of a screw or the like and therefore intersect the aperture 2 (Fig. 3) so that they may make such engagement. My improved device has a continuous wall 5 surrounding the aperture 2 (Fig. 3) and this wall 5 is preferably extended beyond the base portion 1 and toward the yieldable fingers to provide a tubular portion 6 the purpose of which will be more fully hereinafter described.

In order to secure a device with a continuous wall 5 surrounding the aperture 2 and at the same time form the yieldable portions 3—3 from material within the periphery of the base 1, I have blanked out the yieldable portions 3—3 from material which lies between and spaced inwardly from both the aperture 2 and opposite ends of the base portion 1. It will be noted that one yieldable portion 3 is formed at one side of the aperture and the other yieldable portion 3 is formed at the other side of the aperture 2. From the initial blanking, as shown in Fig. 5, the device is placed between suitable die members (not shown) which bend the yieldable portions 3—3 out of the plane of the base portion 1 and then form the corrugations 7—7 at the sides of the yieldable portions 3—3. This latter action causes a foreshortening of the base in the direction of the yieldable portions thereby causing the yieldable portions to move toward each other until the free ends 4—4 overlie the projection 6 and intersect the aperture 2, as clearly illustrated in Figs. 3 and 4.

I have also provided one or more support-engaging projections 8 which are formed integral with the base portion 1 (Fig. 2) and extend therefrom in the opposite direction from the direction of the tubular portion 6. These projections 8 are more or less rough or sharp so that they may bite into one of the parts to be secured together by my improved device thereby preventing accidental rotation of the nut member.

In Figs. 1 and 2 I have illustrated my improved device in association with an ordinary type of screw 9 having a threaded shank 10 and securing together two members 11 and 12. The installation preferably may be secured together by inserting the shank 10 of the screw 9 through preformed apertures in the members 11 and 12 and then approaching the nut device toward the shank 10 of the screw 9 to enter it into the aperture 2. Upon continued approaching movement the shank is guided by the tubular portion 6 into contact with the ends 4—4 of the yieldable portions 3—3. The nut is then thrust, by a straight relative approaching movement, into contact with the member 12 while the screw head is held against the member 11. During this action the yieldable portions 3—3 act somewhat in the nature of pawls of a ratchet as they pass over the threaded shank 10. I have found that the best results may be obtained by then turning the screw 9 relative to the nut thereby to draw the yieldable portions 3—3 toward the body portion 1. In this manner the end portions 4—4 wedge themselves tightly into the thread on the shank 10 and one or both end portions 4—4 contact with the end of the tubular portion 6, as clearly shown in Fig. 2. Thus the tubular portion 6 acts as a stop to prevent the yieldable portions 3—3 from passing by a point which would give the most efficient locking action between the screw 8 and the nut device. As a matter of fact, the ends 4—4 are jammed tightly into thread on the shank 9 and it takes considerable torque to loosen the nut once it has been assembled as just described. It will also be noted that during the final tightening operation the support-engaging projections 8 engage the member 12 so that little or no effort is required to hold the nut from rotation during this operation.

The device illustrated in Figs. 6 and 7 is substantially the same as that already described except that in some instances it is desirable to have the body portion flex during the final tightening operation. Therefore, in this instance the base 1 is shown as being normally arched longitudinally in the direction of the yieldable portions 3—3. I have found that by providing an arched body portion 1 the space between the ends 4—4 of the yieldable portions 3—3 may be such that it requires very little pressure to push their ends over the screw thread during the assembling operation. However, during the final tightening operation the body portion is flattened against the member 12 thereby moving the ends 4—4 of the yieldable portions 3—3 toward each other to provide a greater gripping of the thread due to a wedging action. It will be noted that this same action to a lesser degree is obtained in the embodiment of Figs. 1–5 when the projections 8 contact a body 12 into which they do not easily or fully sink, and that in the form of Figs. 8 and 9, hereinafter described, the crimped under edge portion 14 may also serve as a fulcrum spacing the nut body somewhat from the adjacent surface and thus allow flexing of the central portion of the same under tightening stress. In this device (Fig. 7) I have also shown the ends 4—4 of the yieldable portions 3—3 as being normally angled relative to the axis of the aperture 2 thereby to coincide with the angle of the thread and provide a maximum amount of engagment between the ends 4—4 and the thread on the shank of the screw.

In Figs. 8 and 9 I have shown one of my improved nut devices associated with a sheet metal cap 13 which has its peripheral edge portion 14 crimped over the edge of the body portion 1. In this case the body portion has a circular periphery for engagement with the circular cap 13 and the cap is provided for the purpose of concealing the nut member and the ends of the shank of the fastening member to provide a finished appearance when my improved devices are used in assembling parts where the nut device would be more or less exposed to view.

My improved devices are relatively easy to manufacture, they are exceedingly durable, they have much greater holding power than any device for similar use of which I am aware, they are easily guided into position and they are made from a minimum amount of material. Furthermore, they can be disassembled by an unscrewing action so that I secure all the advantages of a separate nut and nut lock plus simplicity, speed and efficiency.

While I have illustrated and described preferred embodiments of my invention, I do not wish to be limited thereby, the scope of my invention being best defined by the following claims.

I claim:

1. A device of the class described having a base portion provided with an aperture to permit passage of the shank of a fastener member, yieldable shank-engaging portions formed integral with said base portion and from material struck from between the edges of the aperture and the edges of said base portion, and said yieldable portions having their ends spaced above and intersecting said aperture at one side of said base portion for engagement with the shank of the fastener member.

2. A device of the class described having a base portion provided with an aperture to permit passage of the shank of a fastener member, yieldable shank-engaging portions formed integral with said base portion and from material between the aperture and the edges of said base portion, said yieldable portions having their ends spaced above and intersecting said aperture at one side of said base portion for engagement with the shank of the fastener member, and ribs formed in said base portion transversely of the direction in which said yieldable portions extend foreshortening said base portion in said direction for the purposes described.

3. A device of the class described having a base portion provided with an aperture surrounded by a continuous wall to permit passage of the shank of a fastener member, yieldable shank-engaging portions formed from material taken out of the base from outside the continuous wall and between the continuous wall and the edge of the base at opposite sides of the aperture, the free ends of said yieldable portions being spaced above the plane of the base and intersecting the said aperture.

4. A device of the class described having a base portion provided with an aperture surrounded by a continuous wall to permit passage of the shank of a fastener member, said continuous wall being in the form of a tubular projection extending outwardly from said base portion, and yieldable shank-engaging portions extending from said base portion and having free ends extending over the outer end of said tubular projection and intersecting said aperture.

5. A device of the class described having a base portion provided with an aperture surrounded by a continuous wall to permit passage of the shank of a fastener member, yieldable shank-engaging portions formed from material taken out of the base between the continuous wall and the edge of the base at opposite sides of the aperture, the free ends of said yieldable portions being spaced above the plane of the base and said base portion being foreshortened in the direction in which said yieldable portions extend, thus positioning the free ends of said yieldable portions in intersecting relation to said aperture.

6. A device of the class described having a base portion provided with an aperture to permit passage of the shank of a fastener member, yieldable shank-engaging portions formed integral with said base portion and from material struck from between the aperture and the edges of said base portion, said base portion being foreshortened in the residual areas from which said shank-engaging portions are struck, and said yieldable portions having their ends spaced above and intersecting by virtue of said foreshortening, said aperture at one side of said base portion for engagement with the shank of the fastener member, and said base portion being arched longitudinally in the direction of said yieldable portions for the purpose described.

7. A device of the class described having a base portion provided with an aperture to permit passage of the shank of a fastener member, yieldable shank-engaging portions formed integral with said base portion and from material between the aperture and the edges of said base portion, and said yieldable portions having their ends spaced above and intersecting said aperture at one side of said base portion for engagement with the shank of the fastener member, and a cap assembled with said base portion and crimped under the edges of the same, whereby the central portion of said base portion may be supported in spaced flexible relation to an adjacent surface.

8. A device of the class described having a base portion provided with an aperture to permit passage of the shank of a fastener member, yieldable shank-engaging portions formed integral with said base portion and from material between the aperture and the edges of said base portion, and said yieldable portions having their ends spaced above and intersecting said aperture at one side of said base portion for engagement with the shank of the fastener member, and support-engaging projections formed integral with and extending from the other side of said base portion.

9. A device of the class described having a base portion normally arched and provided with an aperture surrounded by a continuous wall to permit passage of the shank of a fastener member, yieldable shank-engaging portions formed from material taken out of the base portion from outside of the continuous wall and between the continuous wall and the edge of the base at opposite sides of the aperture, the free ends of said yieldable portions being spaced above the plane of the base, said base having folds foreshortening it in the direction in which the yieldable portion extends, and positioning the free ends of said yieldable portion to intersect said aperture.

WALTER I. JONES.